United States Patent
Imai

(10) Patent No.: US 10,382,671 B2
(45) Date of Patent: Aug. 13, 2019

(54) IMAGE PROCESSING APPARATUS, IMAGE PROCESSING METHOD, AND RECORDING MEDIUM

(71) Applicant: CASIO COMPUTER CO., LTD., Tokyo (JP)

(72) Inventor: Shintaro Imai, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/873,409

(22) Filed: Jan. 17, 2018

(65) Prior Publication Data
US 2018/0205879 A1    Jul. 19, 2018

(30) Foreign Application Priority Data
Jan. 19, 2017   (JP) .................... 2017-007756

(51) Int. Cl.
  *H04N 5/232*   (2006.01)
  *H04N 5/235*   (2006.01)
  *H04N 9/69*    (2006.01)

(52) U.S. Cl.
CPC ....... *H04N 5/23219* (2013.01); *H04N 5/2351* (2013.01); *H04N 5/23222* (2013.01); *H04N 5/23293* (2013.01); *H04N 5/232933* (2018.08); *H04N 9/69* (2013.01)

(58) Field of Classification Search
CPC ............. H04N 5/23219; H04N 5/2351; H04N 5/23222; H04N 5/23293; H04N 5/232933; H04N 9/69
See application file for complete search history.

(56) References Cited

U.S. PATENT DOCUMENTS

| | | | | |
|---|---|---|---|---|
| 2007/0040914 | A1* | 2/2007 | Katagiri | H04N 5/243 348/221.1 |
| 2007/0070214 | A1* | 3/2007 | Nakamura | G06K 9/00221 348/222.1 |
| 2007/0177038 | A1* | 8/2007 | Nakamura | H04N 5/2351 348/241 |
| 2010/0034458 | A1* | 2/2010 | Tada | G06T 5/007 382/167 |

(Continued)

FOREIGN PATENT DOCUMENTS

| | | |
|---|---|---|
| JP | 2008-228185 A | 9/2008 |
| JP | 2010-74222 A | 4/2010 |
| JP | 2015-100091 A | 5/2015 |

*Primary Examiner* — Shahbaz Nazrul
(74) *Attorney, Agent, or Firm* — Fitch, Even, Tabin & Flannery LLP

(57) ABSTRACT

An image processing apparatus includes a reference value acquisition unit, an image processing unit, and a threshold specification unit. The reference value acquisition unit acquires a reference value to become a reference of brightness from a facial area of a human contained in a captured image. The image processing unit divides the facial area of the human into multiple exclusive portions. The threshold specification unit specifies a threshold for brightness used for the division into the multiple portions by the image processing unit based on the reference value acquired by the reference value acquisition unit. The image processing unit performs processing of correcting brightness in all the multiple divided portions by applying different correction modes.

13 Claims, 6 Drawing Sheets

(56) References Cited

U.S. PATENT DOCUMENTS

| | | | |
|---|---|---|---|
| 2011/0013848 A1* | 1/2011 | Hasegawa | G06T 5/008 382/232 |
| 2011/0129149 A1* | 6/2011 | Kang | G06K 9/00281 382/168 |
| 2011/0141316 A1* | 6/2011 | Kubota | G06K 9/00221 348/234 |
| 2011/0279710 A1* | 11/2011 | Lee | H04N 5/2351 348/234 |
| 2011/0317030 A1* | 12/2011 | Ohbuchi | H04N 5/23219 348/229.1 |

* cited by examiner

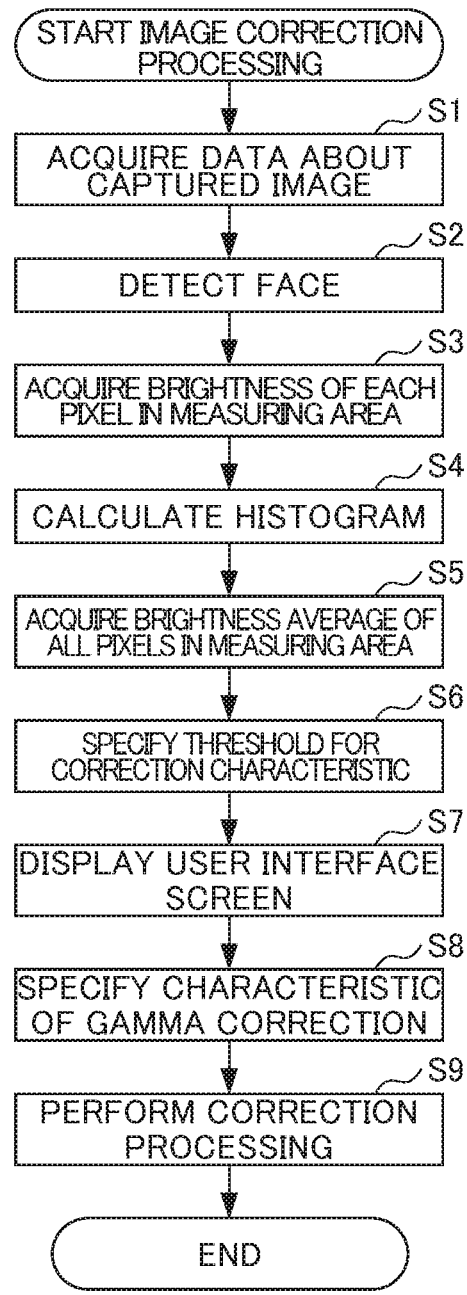

IMAGE PROCESSING APPARATUS, IMAGE PROCESSING METHOD, AND RECORDING MEDIUM

CROSS-REFERENCE TO RELATED APPLICATION

This application is based on and claims the benefit of priority from Japanese Patent Application No. 2017-007756, filed on 19 Jan. 2017, the content of which is incorporated herein by reference.

BACKGROUND OF THE INVENTION

Field of the Invention

The present invention relates to an image processing apparatus, an image processing method, and a recording medium.

Related Art

As described in Japanese Patent Application Publication No. 2008-228185, there has been a conventionally known technique intended to shoot a stereoscopic image of a human face without the need of lighting in a studio, for example. According to this technique, the face of a subject is divided into a right area and a left area, and assistance is given or an image is captured so as to achieve an intended contrast ratio in an image of the face based on a gradation value of the brightness of each of the right and left areas.

SUMMARY OF THE INVENTION

An image processing apparatus according to one aspect of the present invention that performs processing of correcting the brightness of a captured image, comprising: a processor, wherein the processor is configured to perform operations including: acquiring a reference value to become a reference of brightness from a facial area of a human contained in the captured image; dividing the facial area of the human into multiple exclusive portions; specifying a threshold for brightness used for the division into the multiple portions based on the acquired reference value; and correcting brightness in all the divided multiple portions by applying different correction modes. An image processing apparatus according to one aspect of the present invention that performs processing of correcting the brightness of a captured image, comprising: a processor, wherein the processor is configured to perform operations including: acquiring a reference value to become a reference of brightness from a facial area of a human contained in the captured image; specifying a plurality of characteristics each defining a mode for brightness correction differing between exclusively divided three or more brightness ranges each being a brightness range including pixels of a predetermined number in the facial area of the human based on the acquired reference value; and performing processing of correcting the brightness of the facial area of the human by applying the specified characteristics. An image processing apparatus according to one aspect of the present invention that performs processing of correcting the brightness of a captured image, comprising: a processor, wherein the processor is configured to perform operations including: acquiring a reference value to become a reference of brightness from a facial area of a human contained in the captured image; performing processing of correcting the brightness of the facial area of the human by applying a characteristic determined based on the acquired reference value; and specifying a threshold for the acquired reference value used for specifying different characteristics of three types or more of correcting brightness, even if pixels of a predetermined number in the facial area of the human have the same value of brightness. An image processing method according to one aspect of the present invention implemented by an image processing apparatus that performs processing of correcting the brightness of a captured image, the method comprising: an acquisition step of acquiring a reference value to become a reference of brightness from a facial area of a human contained in the captured image; a first division step of dividing the facial area of the human into multiple exclusive portions; a first threshold specification step of specifying a threshold for brightness used for the division into the multiple portions by the first division step based on the reference value acquired by the acquisition step; and an image correction step of performing processing of correcting brightness in all the multiple portions divided by the first division step by applying different correction modes. An image processing method according to one aspect of the present invention implemented by an image processing apparatus that performs processing of correcting the brightness of a captured image, the method comprising: an acquisition step of acquiring a reference value to become a reference of brightness from a facial area of a human contained in the captured image; a characteristic specification step of specifying a plurality of characteristics each defining a mode for brightness correction differing between exclusively divided three or more brightness ranges each being a brightness range including pixels of a predetermined number in the facial area of the human based on the reference value acquired by the acquisition step; and an image correction step of performing processing of correcting the brightness of the facial area of the human by applying the characteristics specified by the characteristic specification step. An image processing method according to one aspect of the present invention implemented by an image processing apparatus that performs processing of correcting the brightness of a captured image, the method comprising: an acquisition step of acquiring a reference value to become a reference of brightness from a facial area of a human contained in the captured image; an image correction step of performing processing of correcting the brightness of the facial area of the human by applying a characteristic determined based on the reference value acquired by the acquisition step; and a second threshold specification step of specifying a threshold for the reference value acquired by the acquisition step used for specifying different characteristics of three types or more with which the image correction step performs the processing of correcting brightness, even if pixels of a predetermined number in the facial area of the human have the same value of brightness.

BRIEF DESCRIPTION OF THE DRAWINGS

FIG. 7 is a flowchart showing a flow of the image correction processing performed by the image processing apparatus in FIG. 1 having the functional configuration in FIG. 2.

DETAILED DESCRIPTION OF THE INVENTION

Figure 1:
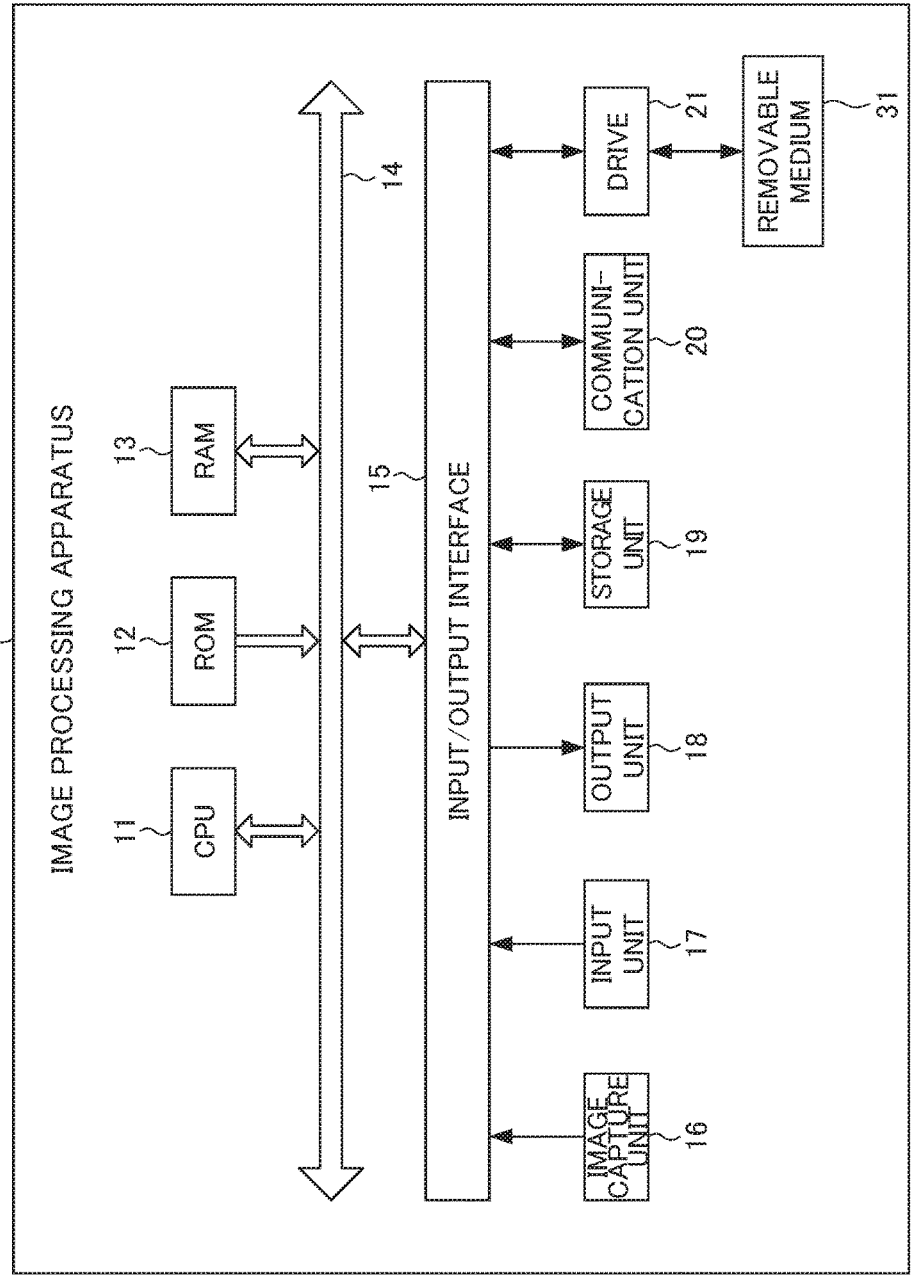
FIG. 1 is a block diagram showing the hardware configuration of an image processing apparatus according to an embodiment of the present invention.

An embodiment of the present invention will be described below by referring to the drawings.

[Configuration]

FIG. 1 is a block diagram showing the hardware configuration of an image processing apparatus 1 as an embodiment of an image processing apparatus according to the present invention. The image processing apparatus 1 is configured as, for example, a digital camera.

The image processing apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processing according to programs that are recorded in the ROM 12, or programs that are loaded from the storage unit 20 to the RAM 13. The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15. The image capture unit 16 includes an optical lens unit and an image sensor, which are not illustrated.

In order to photograph a subject, the optical lens unit is configured by a lens such as a focus lens and a zoom lens for condensing light. The focus lens is a lens for forming an image of a subject on the light receiving surface of the image sensor. The zoom lens is a lens that causes the focal length to freely change in a certain range. The optical lens unit also includes peripheral circuits to adjust setting parameters such as focus, exposure, white balance, and the like, as necessary.

The image sensor is configured by an optoelectronic conversion device, an AFE (Analog Front End), and the like. The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE. The AFE executes a variety of signal processing such as A/D (Analog/Digital) conversion processing of the analog signal. The variety of signal processing generates a digital signal in YUV color space that is output as an output signal from the image capture unit 16. Such an output signal of the image capture unit 16 is hereinafter referred to as "a captured image". Data of a captured image is supplied to the CPU 11, an image processing unit (not illustrated), and the like as appropriate.

The input unit 17 is configured by various buttons and the like, and inputs a variety of information in accordance with instruction operations by the user. The output unit 18 is configured by the display unit, a speaker, and the like, and outputs images and sound. The storage unit 19 is configured by a hard disk, flash memory or the like, and stores data of various images. The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
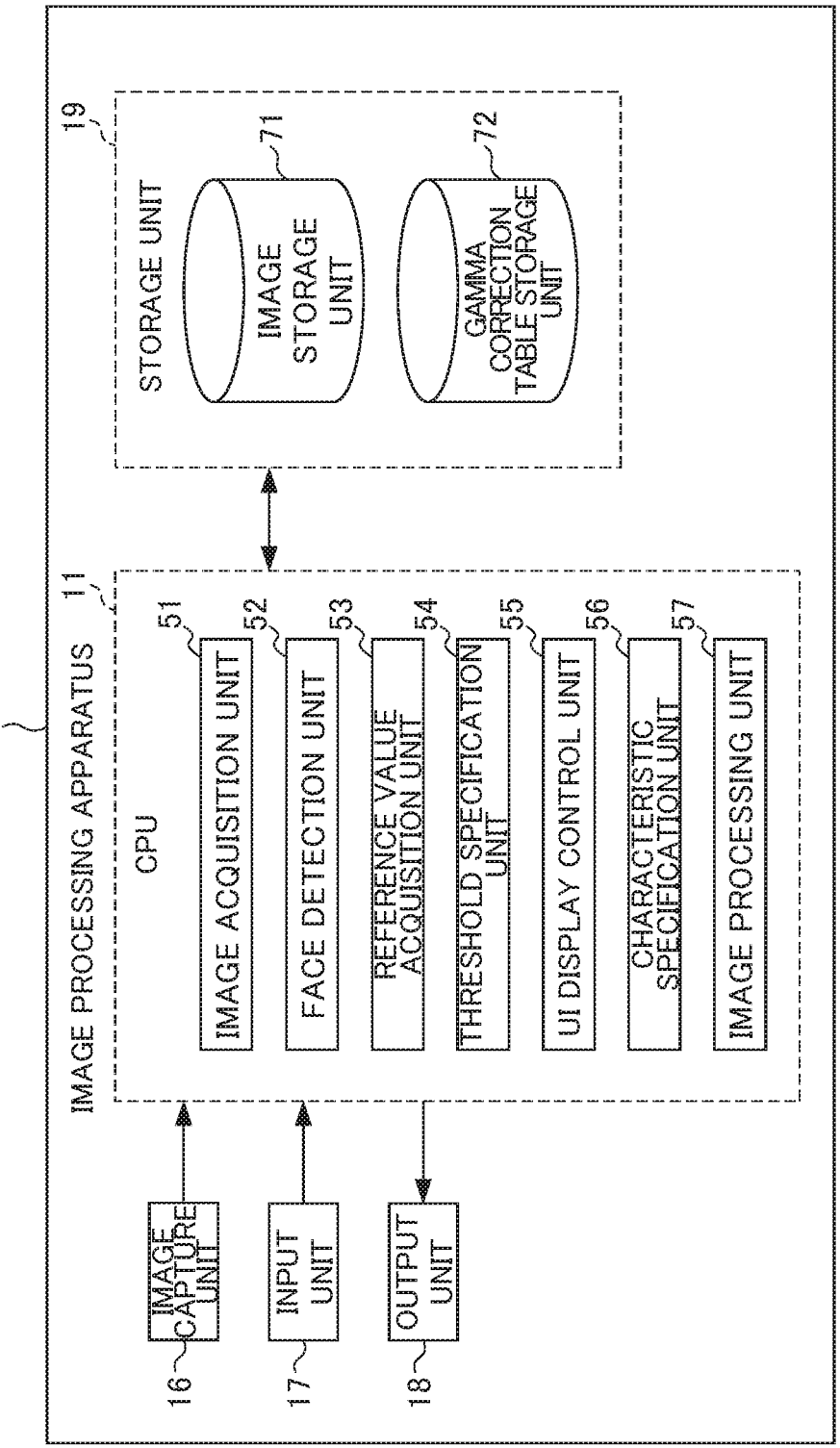
FIG. 2 is a functional block diagram showing a functional configuration belonging to the functional configuration of the image processing apparatus in FIG. 1 and responsible for implementation of image correction processing.

FIG. 2 is a functional block diagram showing a functional configuration belonging to the functional configuration of the image processing apparatus 1 in FIG. 1 and responsible for implementation of image correction processing. The image correction processing is a processing sequence of acquiring a stereoscopic image of a face by applying gamma correction having a characteristic responsive to the brightness of the face of a subject.

As shown in FIG. 2, for implementation of the image correction processing, the following units become functional in the CPU 11: an image acquisition unit 51, a face detection unit 52, a reference value acquisition unit 53, a threshold specification unit 54, a user interface display control unit (UI display control unit) 55, a characteristic specification unit 56, and an image processing unit 57. An image storage unit 71 and a gamma correction table storage unit 72 are defined in a partial region of the storage unit 19.

The image storage unit 71 stores data about a captured image before being corrected by the image correction processing and data about the captured image after being corrected by the image correction processing. The gamma correction table storage unit 72 stores data in a table format representing characteristics of gamma correction to be applied to the image correction processing. In this embodiment, the stored data in a table format representing characteristics of gamma correction includes data about a characteristic of low-brightness gamma correction and data about a characteristic of high-brightness gamma correction. As described later, these characteristics are each applied alone or applied in combination for correction processing on an area of the face of a subject.

Figure 3:
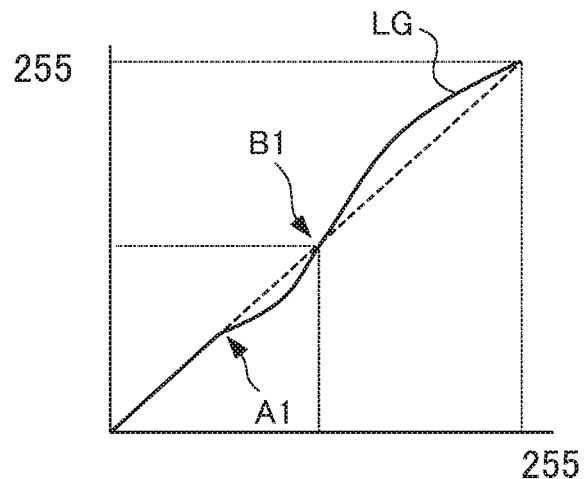
FIG. 3 is a schematic view showing a characteristic of low-brightness gamma correction.
Figure 4:
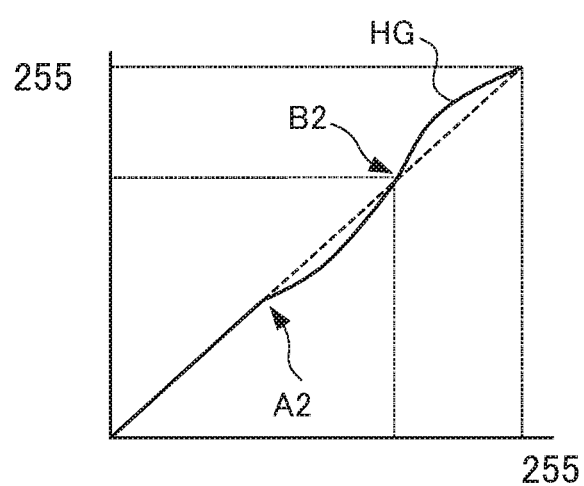
FIG. 4 is a schematic view showing a characteristic of high-brightness gamma correction.

FIG. 3 is a schematic view showing a characteristic LG of low-brightness gamma correction. FIG. 4 is a schematic view showing a characteristic HG of high-brightness gamma correction. In an exemplary case described below, pixel brightness takes a value in a range from 0 to 255. As shown in FIGS. 3 and 4, each of the characteristic LG of low-brightness gamma correction and the characteristic HG of high-brightness gamma correction is such that brightness is maintained in a predetermined range (a range within a lower limit threshold A1 or A2 described later) where the brightness is close to zero, whereas brightness is corrected so as to follow an S-characteristic if the brightness is higher than the predetermined range. A threshold for a lower limit (hereinafter called a "lower limit threshold" as appropriate) A1, to which an S-characteristic is applied on a low brightness side, of the characteristic LG of low-brightness gamma correction is set at a value differing from that of a lower limit threshold A2, to which an S-characteristic is applied on a low brightness side, of the characteristic HG of high-brightness gamma correction. Further, a threshold (hereinafter called a "reference threshold") B1, corresponding to a crossover point in the S-characteristic (a boundary between processing of increasing brightness and processing of reducing brightness), of the characteristic LG of low-brightness gamma correction is set at a value differing from that of a reference threshold B2, corresponding to a crossover point in the S-characteristic (a boundary between processing of increasing brightness and processing of reducing brightness), of the characteristic HG of high-brightness gamma correction.

The image acquisition unit 51 acquires data about a captured image resulting from development processing on an image captured by the image capture unit 16 or data about a captured image stored in the image storage unit 71 (data about a captured image before being corrected by the image correction processing). The face detection unit 52 detects the face of the subject in the data about the captured image acquired by the image acquisition unit 51. The face can be detected by applying existing face detection technology. The face may be detected by any method such as a method of detecting a face based on brightness information or a method of detecting a face by extracting a contour, for example. If the face of the subject is not detected in the data about the captured image acquired by the image acquisition unit 51, the image correction processing is finished.

Figure 5:
FIG. 5 is a schematic view showing a measuring area belonging to an area of the face of a subject.

The reference value acquisition unit 53 acquires a reference value to become a reference indicating the brightness of the face in an area of the face of the subject detected by the face detection unit 52. More specifically, the reference value acquisition unit 53 detects both eyes in the area of the face of the subject detected by the face detection unit 52 through parts detection. The reference value acquisition unit 53 acquires the brightness of each pixel in a rectangular area (hereinafter called a "measuring area") including a nose under the both eyes with respect to the positions of the both eyes as references. Existing parts detection technology is applicable for detecting parts. The parts may be detected by any method such as a method of detecting parts based on brightness information or a method of detecting parts by extracting a contour, for example. FIG. 5 is a schematic view showing a measuring area C belonging to an area of the face of a subject P. As shown in FIG. 5, in this embodiment, a rectangular area belonging to the area of the face of the subject P including a nose under both eyes is set as the measuring area C.

Figure 6:
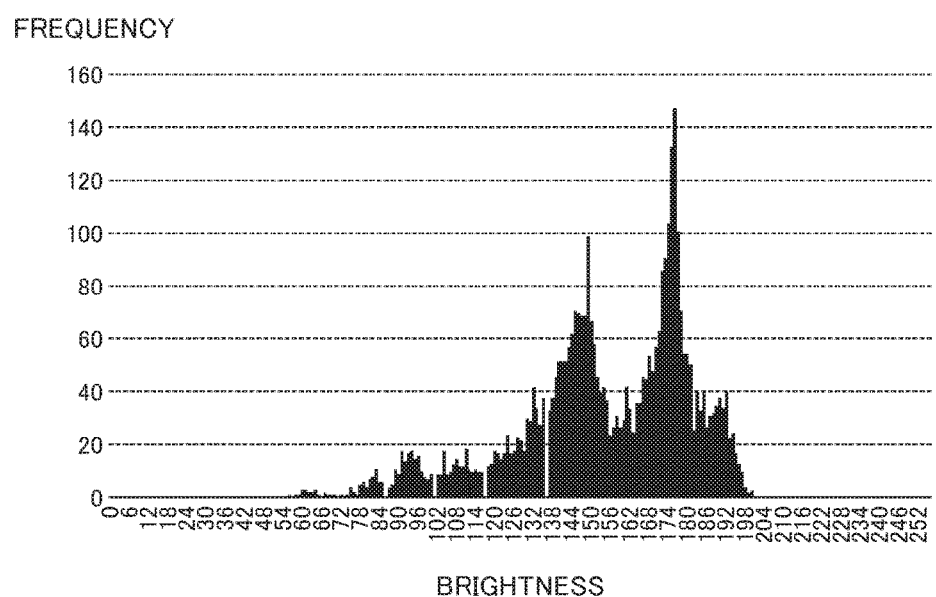
FIG. 6 is a schematic view showing an example of a brightness histogram about all pixels in the measuring area.

The reference value acquisition unit 53 calculates a brightness histogram about all pixels acquired from the measuring area C. Further, the reference value acquisition unit 53 acquires a brightness average of all the pixels. The calculated average is used as the reference value indicating the brightness of the face of the subject. FIG. 6 is a schematic view showing an example of the brightness histogram about all the pixels in the measuring area C. As shown in FIG. 6, each pixel in the measuring area C belongs to any of brightness values shown on the horizontal axis. Based on the histogram, a brightness average in the measuring area C can be acquired.

The threshold specification unit 54 specifies a threshold for a correction characteristic to be applied to the image correction processing based on the calculated brightness average (the reference value indicating the brightness of the face of the subject). More specifically, the threshold specification unit 54 specifies a lower limit threshold to which an S-characteristic of gamma correction is applied on a low brightness side, and a reference threshold corresponding to a crossover point in the S-characteristic.

For correction on the face of the subject by the image correction processing of this embodiment, if the reference value indicating the brightness of the face of the subject (average calculated by the reference value acquisition unit 53) is below a predetermined range for the reference value of brightness (if the brightness of the face is lower than a lower limit (with a brightness average of 140, for example)), the characteristic LG of low-brightness gamma correction is applied. If the reference value indicating the brightness of the face of the subject exceeds the predetermined range for the reference value of brightness (if the brightness of the face is higher than an upper limit (with a brightness average of 180, for example)), the characteristic HG of high-brightness gamma correction is applied. Moreover, if the reference value indicating the brightness of the face of the subject is within the predetermined range for the reference value of brightness (if a brightness average is within a range from the lower limit to the upper limit), a combined characteristic CG of gamma correction responsive to this reference value is calculated and applied based on the characteristic LG of low-brightness gamma correction and the characteristic HG of high-brightness gamma correction.

As described above, if the reference value indicating the brightness of the face of the subject is within the predetermined range for the reference value of brightness, the threshold specification unit 54 calculates a characteristic value including thresholds for a combined characteristic of gamma correction (lower limit thresholds A1 and A2 and reference thresholds B1 and B2). The combined characteristic CG of gamma correction can be calculated by adding a weight to each of the characteristic LG of low-brightness gamma correction and the characteristic HG of high-brightness gamma correction in a manner that depends on the level of the reference value indicating the brightness of the face of the subject between the reference threshold B1 for the characteristic LG of low-brightness gamma correction and the reference threshold B2 for the characteristic HG of high-brightness gamma correction, for example.

The UI display control unit 55 displays any of the characteristic LG of low-brightness gamma correction, the characteristic HG of high-brightness gamma correction, and the combined characteristic CG of gamma correction, together with an image of the face of the subject on a user interface screen in response to the reference value indicating the brightness of the face of the subject. At this time, the UI display control unit 55 displays an image of the face of the subject generated by applying gamma correction to the data about the captured image acquired by the image acquisition unit 51 as a preview image on the display of the output unit 18. The display of this preview image allows a user to check stereoscopic effect achieved by the gamma correction and to determine whether or not the gamma correction is to be performed through the input unit 17.

The characteristic specification unit 56 specifies the characteristic of gamma correction (the characteristic LG of low-brightness gamma correction, the characteristic HG of high-brightness gamma correction, or the combined characteristic CG of gamma correction) displayed on the user interface screen by the UI display control unit 55 as a characteristic of gamma correction to be applied to the image correction processing. Specifically, the characteristic specification unit 56 specifies a characteristic defining a mode for brightness correction differing between exclusively divided multiple brightness ranges (here, three ranges divided at the lower limit threshold A1 or A2 and the reference threshold B1 or B2 as borders), based on the reference value indicating the brightness of the face of the subject.

The image processing unit 57 performs correction processing on the area of the face of the subject based on the characteristic of gamma correction specified by the characteristic specification unit 56. More specifically, the image processing unit 57 divides the area of the face of the subject into a first portion formed of pixels having brightness lower than the lower limit threshold, a second portion formed of pixels having brightness at the lower limit threshold or more and less than the reference threshold, and a third portion formed of pixels having brightness at the reference threshold or more (brightness in a third range). The image processing unit 57 performs processing of maintaining brightness on the first portion, processing of reducing brightness on the second portion, and processing of increasing brightness on the third portion.

In this embodiment, a brightness range below the lower limit threshold A1 or A2 for the area of the face of the subject is a first range. A brightness range from the lower limit threshold A1 or A2 and less than the reference threshold B1 or B2 is a second range. A brightness range from the reference threshold B1 or B2 is the third range. The area of the face of the subject includes the first portion formed of pixels having brightness in the first range, the second portion formed of pixels having brightness in the second range, and the third portion formed of pixels having brightness in the third range. Regarding a characteristic of gamma correction, the lower limit threshold A1 or A2 is a first threshold, the reference threshold B1 or B2 is a second threshold, a lower limit of the predetermined range for the reference value of brightness with respect to the reference value indicating the brightness of the face of the subject is a third threshold, and an upper limit of the predetermined range for the reference value of brightness is a fourth threshold.

A range below the lower limit of the predetermined range for the reference value of brightness is a fourth range. The predetermined range for the reference value of brightness is a fifth range. A range exceeding the upper limit of the predetermined range for the reference value of brightness is a sixth range. Moreover, the characteristic LG of low-brightness gamma correction, applied if the reference value indicating the brightness of the face of the subject is below the predetermined range for the reference value of brightness, is a first characteristic. The characteristic HG of high-brightness gamma correction, applied if the reference value indicating the brightness of the face of the subject exceeds the predetermined range for the reference value of brightness, is a second characteristic.

[Operation]

The operation of the image processing apparatus 1 will be described next. FIG. 7 is a flowchart showing a flow of the image correction processing performed by the image processing apparatus 1 in FIG. 1 having the functional configuration in FIG. 2. The image correction processing is started by operation performed through the input unit 17 for instructing a start of the image correction processing. The operation for instructing a start of the image correction processing is operation for instructing image shooting. After the image capture unit 16 captures an image in response to the operation for instructing image shooting, the image correction processing may be performed sequentially on data about a captured image resulting from development processing on the captured image. Alternatively, the operation for instructing a start of the image correction processing may be operation for starting the image correction processing on data about a captured image acquired from the image storage unit 71.

In step S1, the image acquisition unit 51 acquires data about a captured image resulting from development processing on an image captured by the image capture unit 16 or data about a captured image stored in the image storage unit 71 (data about a captured image before being corrected by the image correction processing). In step S2, the face detection unit 52 detects the face of a subject in the data about the captured image acquired by the image acquisition unit 51.

In step S3, the reference value acquisition unit 53 detects both eyes in an area of the face of the subject detected by the face detection unit 52 through parts detection. Then, the reference value acquisition unit 53 acquires the brightness of each pixel in a rectangular area (measuring area) including a nose under the both eyes with respect to the positions of the both eyes as references. In step S4, the reference value acquisition unit 53 calculates a brightness histogram about all pixels in the rectangular area (measuring area) including the nose under the both eyes. In step S5, the reference value acquisition unit 53 calculates a brightness average of all the pixels in the rectangular area (measuring area) including the nose under the both eyes.

In step S6, the threshold specification unit 54 specifies a threshold for a correction characteristic to be applied to the image correction processing based on the brightness average (a reference value indicating the brightness of the face) calculated in step S5. More specifically, the threshold specification unit 54 specifies the lower limit threshold A1 to which an S-characteristic of gamma correction is applied on a low brightness side, and a reference threshold corresponding to a crossover point in the S-characteristic.

In step S7, the UI display control unit 55 displays any of the characteristic LG of low-brightness gamma correction, the characteristic HG of high-brightness gamma correction, and the combined characteristic CG of gamma correction, together with an image of the face of the subject on the user interface screen in response to the reference value indicating the brightness of the face of the subject. If setting is made through user operation to perform gamma correction, the characteristic of gamma correction (the characteristic LG of low-brightness gamma correction, the characteristic HG of high-brightness gamma correction, or the combined characteristic CG of gamma correction) displayed on the user interface screen by the UI display control unit 55 is specified in step S8 as a characteristic of gamma correction to be applied to the image correction processing. If setting is made through the user operation not to perform gamma correction, the image correction processing is finished.

In step S9, the image processing unit 57 performs correction processing on the area of the face of the subject based on the characteristic of gamma correction specified by the characteristic specification unit 56. In this step, as described above, the image processing unit 57 performs processing of maintaining brightness on the first portion of the area of the face of the subject, processing of reducing brightness on the second portion of this area, and processing of increasing brightness on the third portion of this area. After implementation of step S9, the image correction processing is finished.

As a result of the above-described processing, if the reference value indicating the brightness of the face of the subject is below the predetermined range for the reference value of brightness (if the brightness of the face is lower than the lower limit), the image processing apparatus 1 corrects the image by applying the characteristic LG of low-brightness gamma correction. If the reference value indicating the brightness of the face of the subject exceeds the predetermined range for the reference value of brightness (if the brightness of the face is higher than the upper limit), the image processing apparatus 1 corrects the image by applying the characteristic HG of high-brightness gamma correction. If the reference value indicating the brightness of the face of the subject is within the predetermined range for the reference value of brightness, the image processing apparatus 1 corrects the image by applying the combined characteristic CG of gamma correction responsive to this reference value and calculated based on the characteristic LG of low-brightness gamma correction and the characteristic HG of high-brightness gamma correction.

For correction on the image, the first portion formed of pixels having brightness lower than the lower limit threshold A1 or A2 is subjected to processing of maintaining brightness. The second portion formed of pixels having brightness at the lower limit threshold A1 or A2 or more and less than the reference threshold B1 or B2 is subjected to processing of reducing brightness. The third portion formed of pixels having brightness at the reference threshold B1 or B2 or more is subjected to processing of increasing brightness. By doing so, each part in the face of the subject can be subjected to correction in response to the brightness of the part by applying gamma correction having a characteristic responsive to the brightness of the face of the subject. In this way, the image processing apparatus 1 is allowed to acquire an image of a face with stereoscopic effect properly given in consideration of a feature in the face of the subject.

[First Modification]

In the above-described embodiment, gamma correction applied to the image correction processing has an S-characteristic. Alternatively, gamma correction applied to the image correction processing may have an inverted S-characteristic. Gamma correction having an inverted S-characteristic allows correction of reducing stereoscopic effect. Thus, an image of a face with sharply defined features or a face partially shaded and darkened with hair can be corrected to an image with more proper stereoscopic effect. The UI display control unit 55 may display a live view image on the display of the output unit 18 in a manner that allows a user to select gamma correction by applying an S-characteristic or gamma correction by applying an inverted S-characteristic. By doing so, the user is allowed select which gamma correction is to be performed or determine that gamma correction is not to be performed.

[Second Modification]

In the above-described embodiment, a characteristic of gamma correction applied to the image correction processing is such that brightness is maintained in a predetermined range where the brightness is close to zero, whereas brightness is corrected so as to follow an S-characteristic if the brightness is higher than the predetermined range. Alternatively, regarding each of the characteristic LG of low-brightness gamma correction and the characteristic HG of high-brightness gamma correction, a threshold for an upper limit (hereinafter called an "upper limit threshold") to which an S-characteristic is applied on a high brightness side may be set. In a predetermined range for brightness close to maximum brightness (a range exceeding the upper limit threshold), brightness may be maintained. This makes it possible to reduce the occurrence of highlight clipping at a pixel having high brightness.

[Third Modification]

In the above-described embodiment, an S-characteristic curve of a characteristic of gamma correction displayed by the UI display control unit 55 may be configured to be changeable in response to operation by a user. Specifically, the UI display control unit 55 accepts operation by the user on the displayed user interface screen for changing an S-characteristic curve of the characteristic LG of low-brightness gamma correction, the characteristic HG of high-brightness gamma correction, or a combined characteristic of gamma correction. At this time, the UI display control unit 55 displays a preview image of the face of a subject to which gamma correction having the changed S-characteristic has been applied on the display of the output unit 18 in response to operation by the user through the input unit 17. The lower limit threshold and the reference threshold cannot be changed by operation on the user interface screen. The characteristic specification unit 56 specifies a characteristic of gamma correction resulting from the operation by the user for changing the S-characteristic curve on the user interface screen displayed by the UI display control unit 55 as a characteristic of gamma correction to be applied to the image correction processing. By doing so, the user is allowed to adjust the image of the face of the subject so as to give more proper stereoscopic effect to the image while checking the preview image.

The image processing apparatus 1 having the above-described configuration includes the reference value acquisition unit 53, the image processing unit 57, and the threshold specification unit 54. The reference value acquisition unit 53 acquires a reference value to become a reference of brightness from a facial area of a human contained in a captured image. The image processing unit 57 divides the facial area of the human into multiple exclusive portions. The threshold specification unit 54 specifies a threshold for brightness used for the division into the multiple portions by the image processing unit 57 based on the reference value acquired by the reference value acquisition unit 53. The image processing unit 57 performs processing of correcting brightness in all the multiple divided portions by applying different correction modes. By doing so, each part of the face of a subject can be subjected to correction by applying a correction mode responsive to a distribution of the brightness of the face of the subject. As a result, an image of the face with stereoscopic effect properly given in consideration of a feature in the face of the subject can be acquired.

The number of the portions divided exclusively by the image processing unit 57 is three or more. The threshold specification unit 54 specifies a threshold for brightness used for division into at least two portions viewed from a lowest brightness side based on the reference value acquired by the reference value acquisition unit 53. This makes it possible to specify a boundary defining a low brightness side across which different correction modes are to be applied.

The image processing unit 57 does not perform processing of correcting brightness on the divided first portion of lowest brightness. The image processing unit 57 performs processing of reducing or increasing brightness on the divided second portion of second lowest brightness. By doing so, the first portion and the second portion can be subjected to correction based on an S-characteristic.

If the image processing unit 57 performs processing of reducing brightness on the second portion, the image processing unit 57 performs processing of increasing brightness on the third portion different from the second portion. If the image processing unit 57 performs processing of increasing brightness on the second portion, the image processing unit 57 performs processing of reducing brightness on the third portion. In this way, the image processing unit 57 is allowed to perform correction based on an S-characteristic or an inverted S-characteristic.

The number of the portions divided exclusively by the image processing unit 57 is three or more. The threshold specification unit 54 specifies the reference value acquired by the reference value acquisition unit 53 as a threshold for brightness used for division into at least two portions viewed from a highest brightness side. This makes it possible to specify a boundary defining a high brightness side across which different correction modes are to be applied.

The image processing apparatus 1 further includes the characteristic specification unit 56. The characteristic specification unit 56 specifies a characteristic applied by the image processing unit 57 in performing processing of correcting brightness based on the reference value acquired by the reference value acquisition unit 53. The image processing unit 57 further performs processing of correcting brightness by applying the characteristic specified by the characteristic specification unit 56. By doing so, a characteristic appropriate for correction on an image can be acquired and applied to brightness correction.

The image processing apparatus 1 includes the reference value acquisition unit 53, the characteristic specification unit 56, and the image processing unit 57. The reference value acquisition unit 53 acquires a reference value to become a reference of brightness from a facial area of a human contained in a captured image. The characteristic specification unit 56 specifies a characteristic defining a mode for brightness correction differing between exclusively divided three or more brightness ranges each being a brightness range including pixels of a predetermined number in the facial area of the human based on the reference value acquired by the reference value acquisition unit 53. The image processing unit 57 performs processing of correcting the brightness of the facial area of the human by applying the characteristic specified by the characteristic specification unit 56. By doing so, the facial area of the subject can be subjected to correction by applying the correction mode differing between the brightness ranges each including pixels of a predetermined number in the facial area of the subject. As a result, an image of a face with stereoscopic effect properly given in consideration of a feature in the face of the subject can be acquired.

The image processing unit 57 does not perform processing of correcting brightness on the first range of lowest brightness. The image processing unit 57 performs processing of reducing or increasing brightness on the second range of second lowest brightness. This makes it possible to prevent a low-brightness portion in the face of the subject such as a portion with a blotch or a mole from becoming noticeable as a result of correction.

If the image processing unit 57 performs processing of reducing brightness on the second range, the image processing unit 57 performs processing of increasing brightness on the third range different from the second range. If the image processing unit 57 performs processing of increasing brightness on the second range, the image processing unit 57 performs processing of reducing brightness on the third range. By doing so, correction can be performed based on an S-characteristic or an inverted S-characteristic.

The image processing apparatus 1 includes the reference value acquisition unit 53, the image processing unit 57, and the threshold specification unit 54. The reference value acquisition unit 53 acquires a reference value to become a reference of brightness from a facial area of a human contained in a captured image. The image processing unit 57 performs processing of correcting the brightness of the facial area of the human by applying a characteristic determined based on the reference value acquired by the reference value acquisition unit 53. The threshold specification unit 54 specifies a threshold for the reference value acquired by the reference value acquisition unit 53 used for specifying different characteristics of three types or more with which the image processing unit 57 performs the processing of correcting brightness, even if pixels of a predetermined number in the facial area of the human have the same value of brightness. By doing so, even if pixels have the same value of brightness, the different characteristics of three types or more are specified with which corrections are performed in different modes. As a result, an image of a face with proper stereoscopic effect can be acquired.

The image processing unit 57 divides a brightness range for the reference value into at least the fourth range corresponding to a low-brightness range, the sixth range corresponding to a high-brightness range, and the fifth range between the fourth range and the sixth range based on the threshold specified by the threshold specification unit 54. The image processing unit 57 performs processing of correcting brightness by applying a characteristic differing between the divided ranges. By doing so, a correction mode responsive to a brightness range in the face of a subject can be applied and each range in the face of the subject can be subjected to appropriate correction.

If brightness at the reference value is within the fourth range, the image processing unit 57 applies first characteristic independently of the brightness at the reference value in performing the processing of correcting brightness. If brightness at the reference value is within the sixth range, the image processing unit 57 applies the second characteristic independently of the brightness at the reference value in performing the processing of correcting brightness. If brightness at the reference value is within the fifth range, the image processing unit 57 applies a characteristic specified in response to the brightness at the reference value based on the first characteristic and the second characteristic in performing the processing of correcting brightness. By doing so, brightness can be corrected by applying a more appropriate characteristic in response to the brightness of the face of the subject.

The first characteristic is a characteristic appropriate for brightness as a threshold between the fourth range and the fifth range. The second characteristic is a characteristic appropriate for brightness as a threshold between the fifth range and the sixth range. Thus, a characteristic applied to brightness correction can be set based on a characteristic appropriate for predetermined low brightness and a characteristic appropriate for predetermined high brightness.

The image processing unit 57 divides the facial area of the human into multiple portions in response to a distribution of the brightness of the facial area of the human. The image processing unit 57 further performs processing of correcting brightness in a mode differing between the multiple divided portions respectively. By doing so, each part of the face of the subject can be subjected to correction by applying a correction mode responsive to the distribution of the brightness of the face of the subject.

The reference value acquisition unit 53 acquires an average of the brightness of a portion including a nose under human eyes contained in the captured image as the reference value. By doing so, the reference value of the brightness of the face of the human can be acquired based on the portion assumed to indicate the brightness of the face of the human correctly.

It should be noted that the present invention is not limited to the aforementioned embodiment but modifications, improvements, etc. within a scope that can achieve the object of the present invention are included in the present invention.

In the above-described embodiment, a reference value indicating the brightness of the face of a subject is acquired from a rectangular area including a nose under both eyes as a measuring area. However, this is not the only case. For example, the measuring area may cover the face of the subject entirely, and a reference value indicating the brightness of the face of the subject may be acquired from this measuring area.

In the above-described embodiment, gamma correction having an S-characteristic as a characteristic of brightness correction is applied. However, this is not the only case. For example, a characteristic other than an S-characteristic may be applied to brightness correction, as long as such a characteristic is applicable for adjusting stereoscopic effect in the face of a subject.

In the above-described embodiment, the image acquisition unit 51 uses data about a captured image resulting from development processing on an image captured by the image capture unit 16 as data about a captured image to be subjected to the image correction processing. Alternatively, the image acquisition unit 51 acquires the data about the captured image to be subjected to the image correction processing from the image storage unit 71. However, this is not the only case. For example, the image acquisition unit 51 may acquire captured images output sequentially from the image capture unit 16 and before being subjected to development processing. In this case, the UI display control unit 55 may display an image of the face of a subject as a live view image generated by applying gamma correction to data about a captured image output from the image capture unit 16 and acquired by the image acquisition unit 51. Alternatively, the UI display control unit 55 may omit display on the user interface.

According to the above-described embodiment, a digital camera is shown as an example of the image processing apparatus 1 to which the present invention is applied. However, the image processing apparatus 1 is not particularly limited to a digital camera. For example, the present invention is applicable to common electronic devices having the function of the image processing. More specifically, for example, the present invention is applicable to notebook personal computers, printers, television receivers, video cameras, portable navigation devices, portable telephones, smartphones, handheld game consoles, etc.

The above-described processing sequence can be executed by hardware or by software. In other words, the functional configuration shown in FIG. 2 is merely an illustrative example, and the present invention is not particularly limited to this configuration. Specifically, as long as the image processing apparatus 1 has a function enabling the above-described processing sequence to be executed in its entirety, the types of functional blocks employed to realize this function are not particularly limited to the example shown in FIG. 2. In addition, a single functional block may be configured by a hardware unit, by a software unit, or by combination of the hardware and software units. The functional configuration according to the present embodiment is realized by a processor to execute arithmetic processing. The processor applicable to the present invention includes processors formed of various processing units such as a single processor, a multiprocessor, and a multi-core processor, and processors formed of combinations between these processing units and processing circuits such as an application specific integrated circuit (ASIC) and a field-programmable gate array, for example.

If the processing sequence is to be executed by software, a program configuring the software is installed from a network or a storage medium into a computer, for example. The computer may be a computer embedded in dedicated hardware. Alternatively, the computer may be a general-purpose personal computer, for example, capable of executing various functions by means of installation of various programs.

The storage medium containing such programs can not only be constituted by the removable medium 31 shown in FIG. 1 distributed separately from an apparatus body in order to supply the programs to a user, but can also be constituted by a storage medium or the like supplied to the user in a state of being incorporated in the apparatus body in advance. The removable medium 31 is for example formed of a magnetic disk (including a floppy disk), an optical disk, or a magneto-optical disk. The optical disk is for example formed of a compact disk read-only memory (CD-ROM), a digital versatile disk (DVD), or a Blu-ray (registered trademark) Disk (Blu-ray Disk). The magneto-optical disk is for example formed of a Mini-Disk (MD). The storage medium, which is supplied to the user in a state of being incorporated in the apparatus body in advance, is for example formed of the ROM 12 shown in FIG. 1 storing a program or a hard disk included in the storage unit 19 shown in FIG. 1.

It should be noted that, in the present specification, the steps describing the program stored in the storage medium include not only processes executed in a time-series manner according to the order of the steps, but also processes executed in parallel or individually and not always required to be executed in a time-series manner.

While some embodiments of the present invention have been described above, these embodiments are merely exemplifications, and are not to limit the technical scope of the present invention. Various other embodiments can be employed for the present invention, and various modifications such as omissions and replacements are applicable without departing from the substance of the present invention. Such embodiments and modifications are included in the scope of the invention and the summary described in the present specification, and are included in the invention recited in the claims as well as in the equivalent scope thereof.

What is claimed is:

1. An image processing apparatus that performs processing of correcting the brightness of a captured image, comprising:
   a processor,
   wherein the processor is configured to perform operations including:
   acquiring a reference value to become a reference of brightness from a facial area of a human contained in the captured image;
   dividing the facial area of the human into multiple exclusive portions;
   specifying a threshold for brightness used for the division into the multiple portions based on the acquired reference value; and
   correcting brightness in all the divided multiple portions by applying different correction modes,
   wherein the number of the portions divided exclusively is three or more, and the processor specifies a threshold for brightness used for division into at least two portions viewed from a lowest brightness side based on the acquired reference value, wherein the processor does not perform processing of correcting brightness on a first portion which is divided and having lowest brightness, and the processor performs processing of reducing or increasing brightness on a second portion which is divided and having second lowest brightness, wherein if the processor performs processing of reducing brightness on the second portion, the processor performs processing of increasing brightness on a third portion different from the second portion, and if the processor performs processing of increasing brightness on the second portion, the processor performs processing of reducing brightness on the third portion.

2. The image processing apparatus according to claim 1, wherein the processor specifies the acquired reference value as a threshold for brightness used for division into at least two portions viewed from a highest brightness side.

3. The image processing apparatus according to claim 1, wherein the processor further specifies a characteristic applied in performing processing of correcting brightness based on the acquired reference value, wherein the processor further performs processing of correcting brightness by applying the specified characteristic.

4. An image processing apparatus that performs processing of correcting the brightness of a captured image, comprising:

a processor, wherein the processor is configured to perform operations including:

acquiring a reference value to become a reference of brightness from a facial area of a human contained in the captured image;

specifying a plurality of characteristics each defining a mode for brightness correction differing between exclusively divided three or more brightness ranges each being a brightness range including pixels of a predetermined number in the facial area of the human based on the acquired reference value; and performing processing of correcting the brightness of the facial area of the human by applying the specified characteristics, wherein the processor does not perform processing of correcting brightness on a first range of lowest brightness, and the processor performs processing of reducing or increasing brightness on a second range of second lowest brightness, wherein if the processor performs processing of reducing brightness on the second range, the processor performs processing of increasing brightness on a third range different from the second range, and if the processor performs processing of increasing brightness on the second range, the processor performs processing of reducing brightness on the third range.

5. An image processing apparatus that performs processing of correcting the brightness of a captured image, comprising:

a processor, wherein the processor is configured to perform operations including:

acquiring a reference value to become a reference of brightness from a facial area of a human contained in the captured image;

performing processing of correcting the brightness of the facial area of the human by applying a characteristic determined based on the acquired reference value; and specifying a threshold for the acquired reference value used for specifying different characteristics of three types or more of correcting brightness, even if pixels of a predetermined number in the facial area of the human have the same value of brightness.

6. The image processing apparatus according to claim 5, wherein the processor further divides a brightness range for the reference value into at least a fourth range corresponding to a low-brightness range, a sixth range corresponding to a high-brightness range, and a fifth range between the fourth range and the sixth range based on the specified threshold, wherein the processor performs processing of correcting brightness by applying a characteristic differing between the divided ranges.

7. The image processing apparatus according to claim 6, wherein if brightness at the reference value is within the fourth range, the processor applies a first characteristic independently of the brightness at the reference value in performing the processing of correcting brightness, if brightness at the reference value is within the sixth range, the processor applies a second characteristic independently of the brightness at the reference value in performing the processing of correcting brightness, and if brightness at the reference value is within the fifth range, the processor applies a characteristic specified in response to the brightness at the reference value based on the first characteristic and the second characteristic in performing the processing of correcting brightness.

8. The image processing apparatus according to claim 7, wherein the first characteristic is a characteristic appropriate for brightness as a threshold between the fourth range and the fifth range, and the second characteristic is a characteristic appropriate for brightness as a threshold between the fifth range and the sixth range.

9. The image processing apparatus according to claim 5, wherein the processor further divides the facial area of the human into multiple portions in response to a distribution of the brightness of the facial area of the human, wherein the processor further performs processing of correcting brightness in a mode differing between the divided multiple portions respectively.

10. The image processing apparatus according to claim 1, wherein the processor acquires an average of the brightness of a portion including a nose under human eyes contained in the captured image as the reference value.

11. An image processing method implemented by an image processing apparatus that performs processing of correcting the brightness of a captured image, the method comprising:

acquiring a reference value to become a reference of brightness from a facial area of a human contained in the captured image;

dividing the facial area of the human into multiple exclusive portions;

specifying a threshold for brightness used for the division into the multiple exclusive portions based on the acquired reference value; and performing processing of correcting brightness in all the exclusive multiple portions by applying different correction modes, wherein the number of the portions divided exclusively is three or more, and specifying the threshold for brightness includes specifying a threshold for brightness used for division into at least two portions viewed from a lowest brightness side based on the acquired reference value, wherein processing of correcting brightness on a first portion which is divided and having lowest brightness is not performed, and performing processing of reducing or increasing brightness on a second portion which is divided and having second lowest brightness, wherein if processing of reducing brightness on the second portion is performed, performing processing of increasing brightness on a third portion different from the second portion, and if processing of increasing brightness on the second portion is performed, performing processing of reducing brightness on the third portion.

12. An image processing method implemented by an image processing apparatus that performs processing of correcting the brightness of a captured image, the method comprising:

acquiring a reference value to become a reference of brightness from a facial area of a human contained in the captured image;

specifying a plurality of characteristics each defining a mode for brightness correction differing between exclusively divided three or more brightness ranges each being a brightness range including pixels of a predetermined number in the facial area of the human based on the acquired reference value; and performing processing of correcting the brightness of the facial area of the human by applying the specified characteristics, wherein processing of correcting brightness on a first range of lowest brightness is not performed, and performing processing of reducing or increasing brightness on a second range of second lowest brightness, wherein if processing of reducing brightness on the second range is performed, performing processing of increasing brightness on a third range different from the second range, and if processing of increasing brightness on the second range is performed, performing processing of reducing brightness on the third range.

13. An image processing method implemented by an image processing apparatus that performs processing of correcting the brightness of a captured image, the method comprising:

acquiring a reference value to become a reference of brightness from a facial area of a human contained in the captured image;

performing processing of correcting the brightness of the facial area of the human by applying a characteristic determined based on the acquired reference value; and specifying a threshold for the acquired reference value used for specifying different characteristics of three types or more of correcting brightness, even if pixels of a predetermined number in the facial area of the human have the same value of brightness.

* * * * *